(12) United States Patent
G. R.

(10) Patent No.: US 10,180,190 B2
(45) Date of Patent: Jan. 15, 2019

(54) METHOD, SYSTEM, APPARATUS AND DEVICE FOR DIRECTIONAL FLOW CONTROL OF FLUIDS AND GASES

(71) Applicant: Bharath Sai Kumar G. R., Tumkur (IN)

(72) Inventor: Bharath Sai Kumar G. R., Tumkur (IN)

( * ) Notice: Subject to any disclaimer, the term of this patent is extended or adjusted under 35 U.S.C. 154(b) by 115 days.

(21) Appl. No.: 14/917,582

(22) PCT Filed: Sep. 26, 2014

(86) PCT No.: PCT/IN2014/000621
§ 371 (c)(1),
(2) Date: Mar. 9, 2016

(87) PCT Pub. No.: WO2015/044959
PCT Pub. Date: Apr. 2, 2015

(65) Prior Publication Data
US 2016/0223090 A1  Aug. 4, 2016

(30) Foreign Application Priority Data
Sep. 27, 2013 (IN) .......................... 4408/CHE/2013

(51) Int. Cl.
*F15B 13/04* (2006.01)
*F16K 11/07* (2006.01)
(Continued)

(52) U.S. Cl.
CPC .............. *F16K 11/07* (2013.01); *F15B 1/26* (2013.01); *F15B 11/08* (2013.01);
(Continued)

(58) Field of Classification Search
CPC ..... Y10T 137/86533; Y10T 137/86541; Y10T 137/86549; Y10T 137/86566;
(Continued)

(56) References Cited

U.S. PATENT DOCUMENTS 1,530,881 A * 3/1925 Burks ..................... F01L 33/02
123/41 R
2,550,723 A * 5/1951 Ross ....................... F01L 25/04
60/369
(Continued)

FOREIGN PATENT DOCUMENTS

CN      201753716        3/2011
CN      201753716 U  *  3/2011   .............. F15B 13/02
(Continued)

OTHER PUBLICATIONS

Machine Translation of CN201753716U, Multi-Way Reversing Valve, retrieved from the internet on Dec. 8, 2017;retrieved from [https://dialog.proquest.com/ on Dec. 8, 2017]; Inventor, Luo Xuerong, Published on Mar. 2, 2011.*
(Continued)

*Primary Examiner* — Craig J Price

(57) ABSTRACT

A system for controlling plurality of pistons in a corresponding plurality of actuators comprises a pump, a tank and a cylindrically shaped valve. The cylindrically shaped valve comprises an outer hollow cylinder with a first, a second, a third and a fourth set of holes, and the inner cylinder with a cylindrical base, and having a first and a second set of non-overlapping spiral grooves that are parallel to each other, in that the first set of holes are at different distance from the cylindrical base, the third set of holes maintain one to one correspondence with the first set of holes at 180 degrees opposite, the second set of holes maintain one to one correspondence with the first set of holes at same distance in a straight line, 180 degrees, the fourth set of holes maintain one to one correspondence with the second set of holes, 180 degrees opposite.

5 Claims, 13 Drawing Sheets

(51) Int. Cl.
*F16K 11/085* (2006.01)
*F15B 1/26* (2006.01)
*F15B 11/08* (2006.01)

(52) U.S. Cl.
CPC ...... *F15B 13/0401* (2013.01); *F15B 13/0406* (2013.01); *F16K 11/0856* (2013.01); *F15B 2211/405* (2013.01); *Y10T 137/86533* (2015.04); *Y10T 137/86549* (2015.04); *Y10T 137/86566* (2015.04); *Y10T 137/86646* (2015.04); *Y10T 137/86662* (2015.04)

(58) Field of Classification Search
CPC ..... Y10T 137/86638; Y10T 137/86646; Y10T 137/86654; Y10T 137/86662; F15B 13/0406; F15B 13/0401; F15B 11/08; F15B 1/26; F15B 221/405; F16K 11/0856; F16K 11/07
USPC ............. 137/625.21–625.24, 625.15–625.17, 137/625.19; 91/180, 503
See application file for complete search history.

(56) References Cited

U.S. PATENT DOCUMENTS

| | | | | |
|---|---|---|---|---|
| 2,921,604 A * | 1/1960 | Zettl | ................... | F16K 11/0856 137/625.43 |
| 2,992,633 A * | 7/1961 | Stiglic | ...................... | F15B 9/10 91/375 R |
| 3,106,224 A * | 10/1963 | Moss | ................. | F15B 13/0402 137/625.63 |
| 3,454,049 A * | 7/1969 | Hoos | ...................... | F15B 13/04 137/625.23 |
| 3,672,168 A * | 6/1972 | Salmon | ................. | B60K 17/10 418/212 |
| 3,918,494 A | 11/1975 | Dalton | | |
| 3,967,394 A * | 7/1976 | Kelley | ..................... | B66D 1/48 175/45 |
| 4,397,335 A * | 8/1983 | Doblar | .............. | A61B 5/02152 137/625.19 |
| 5,467,800 A * | 11/1995 | Sallas | .................. | F15B 21/125 137/624.13 |
| 6,058,703 A | 5/2000 | Smith | | |
| 6,817,381 B2 * | 11/2004 | Otsuki | ............... | F16K 11/0856 137/884 |
| 7,793,687 B2 * | 9/2010 | Smith | ..................... | B60P 7/065 137/223 |
| 8,490,643 B2 * | 7/2013 | Hanson | ................. | B29C 47/062 137/240 |
| 8,621,883 B2 * | 1/2014 | Burk | ...................... | F25B 17/08 62/324.6 |
| 8,852,782 B2 * | 10/2014 | Lee | ........................ | B60L 11/187 429/120 |
| 9,611,946 B1 * | 4/2017 | Potter | ................. | F16K 11/0856 |
| 2009/0272256 A1 * | 11/2009 | Knussman | ............. | F01B 3/102 91/368 |
| 2013/0219873 A1 * | 8/2013 | Xu | ............................ | F15B 9/08 60/325 |
| 2017/0184057 A1 * | 6/2017 | Weigl | ..................... | F02M 25/08 |
| 2017/0191574 A1 * | 7/2017 | Takamatsu | ............. | F16K 11/02 |

FOREIGN PATENT DOCUMENTS

| | | | | |
|---|---|---|---|---|
| DE | 102015000424 B3 * | 4/2016 | ........... | F16K 11/076 |
| WO | WO 2014076087 A1 * | 5/2014 | ............... | F24D 3/18 |

OTHER PUBLICATIONS

Translation of CN 2017-53716 U, Translation aquired on Mar. 23, 2018 from STIC translations.*

* cited by examiner

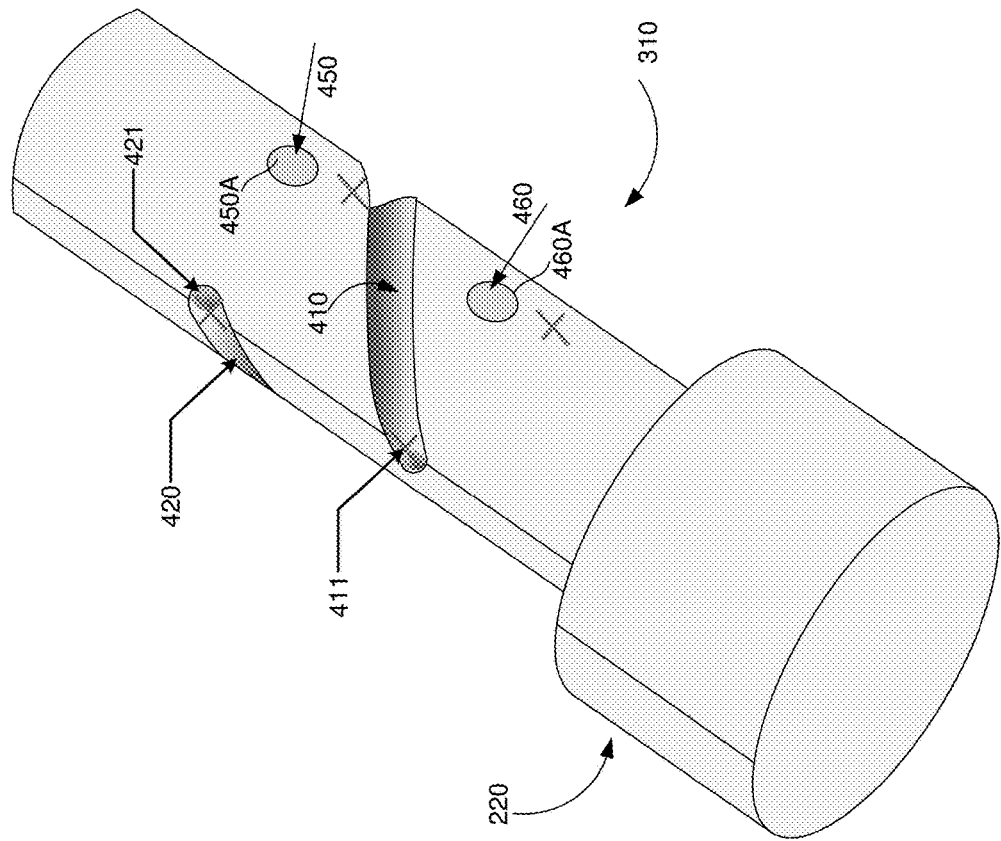
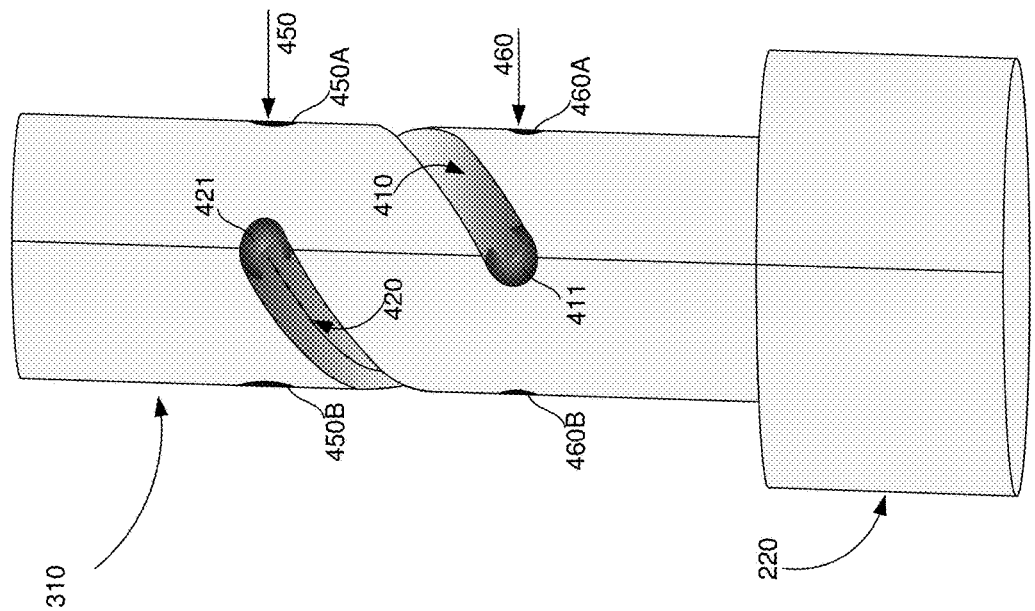
FIG. 4B
FIG. 4A

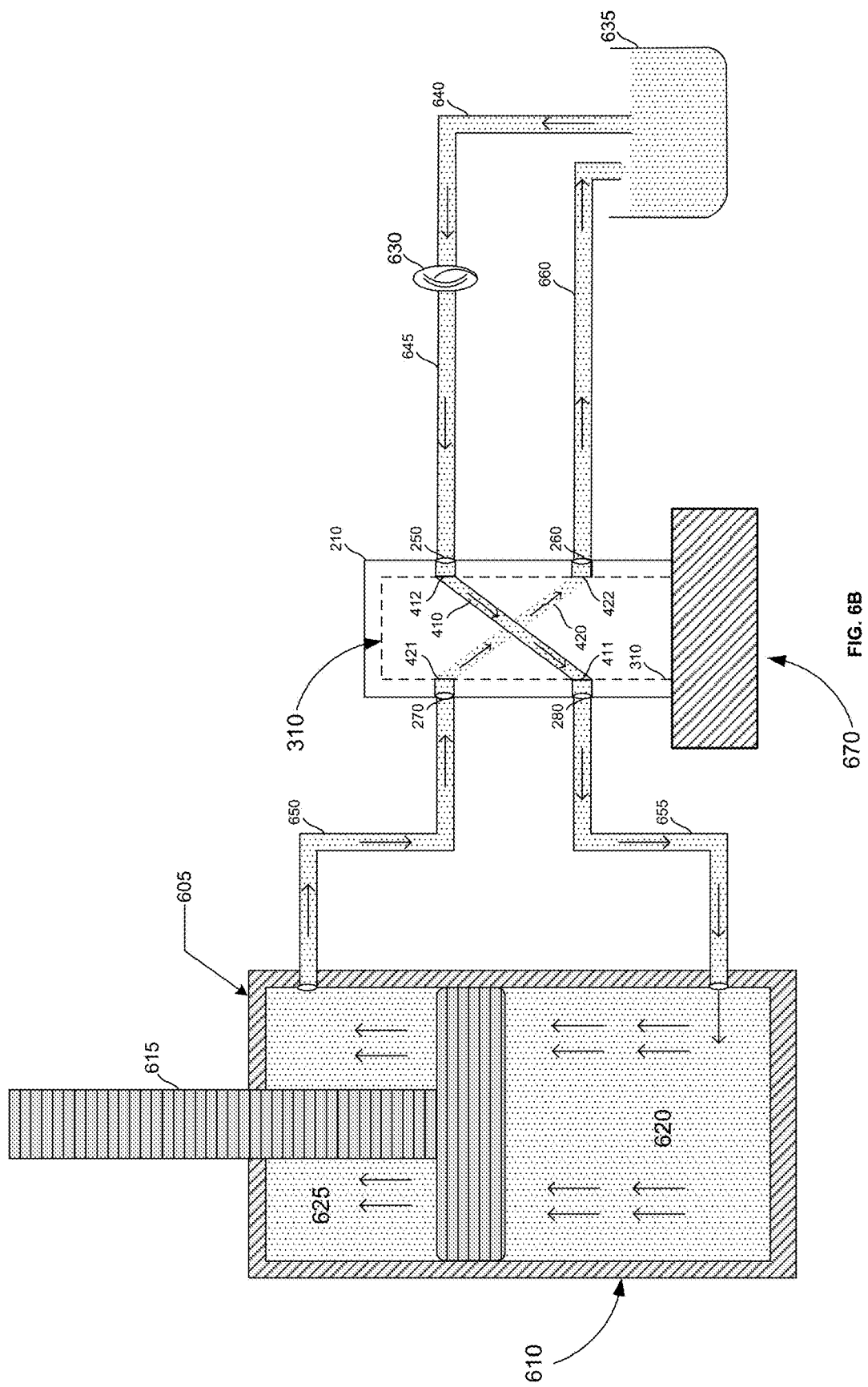

METHOD, SYSTEM, APPARATUS AND DEVICE FOR DIRECTIONAL FLOW CONTROL OF FLUIDS AND GASES

CROSS REFERENCES TO RELATED APPLICATIONS

This application claims priority from Indian patent application No. 4408/CHE/2013 filed on Sep. 27, 2013 which is incorporated herein in its entirety by reference.

STATEMENT REGARDING FEDERALLY SPONSORED RESEARCH OR DEVELOPMENT

Not Applicable

COPYRIGHT NOTIFICATION

No Copyright Notification

BACKGROUND

Technical Field

Embodiments of the present disclosure relate generally to mechanical engineering and in particular to method, system, apparatus and device for directional flow control of fluids and gases.

Related Art

A valve is a device which regulates, directs and controls the flow of a fluid. Valves are often used to control the pressure, flow rate and flow direction of the fluid/gases (hereafter referred to as "fluids" in general). The fluid may include gases, air, liquids, fluidized solids, or slurries. In general, the movement of fluid is from a higher pressure area to a lower pressure area.

Generally fluid is pressurized using a pump and this pressurized fluid is used to control actuator in which a pressurized fluid causes linear movement of a piston. The pressure, quantity of fluid is generally determined based on the size of the actuator piston and the force needed to get a specific work done by piston. Valves are used to control the direction of the movement of the piston in the actuator. A spindle in the valve operates to control the flow of the fluid. When the spindle is at a first position, the pressurized fluid in made to flow in one direction. When the spindle is moved to the second position, the fluid is made to flow in the other direction. Thus, the valve is used to control the movement of the piston back and forth. Hence a small force exerted on the spindle of the valve controls the large force applied to the actuator piston. In one prior technique, a spool valve is used to control the actuator piston movement.

FIG. 1 is a conventional system shown comprising actuator 105, pump 110, tank 120 and spool valve 115 with connecting pipes 125,130,135,140,145,150. Each element is described below in further detail.

The pipes 150 and 145 are connected respectively to the tank outlet 111 and 112 to guide the fluids into the tank/reservoir. The pipe 125 is connected between the tank and inlet to the pump 110. The pump sucks the fluid through the pipe 125. The pipe 130 is connected between the pump outlet and pressure inlet (P) 113. The pressurized fluid (by the pump) is forced through the pipe 130 to the pressure inlet (P) 113 of the valve. The pipe 135 is connected between the port A of the valve and the piston rod side space of the cylinder. The pipe 140 is connected between the port B and the flat side (of the piston) space of the cylinder. The tank 120 stores the fluid, liquids, fluidized solids etc. The tank 120 represents atmosphere in the case of air, or gases.

The spool valve 115 is shown comprising spindle 118, tank inlets (T) 111 and 112, pressure port (P) 113, port A 116 and port B 117. When the spindle 118 is in first position (as shown in FIG. 1) the pressure port (P) 113 is connected to the port A 116 and tank inlet 112 is connected to port B 117. When the spindle 118 is in second position (moved upwards from the position shown in FIG. 1) the pressure inlet (P) 113 is connected to port B 117 and the tank inlet is connected to the port A 116. The actuator is shown with an actuator cylinder 155, actuator piston with rod 160, piston side space 165, and flat side space 157.

The manner in which the actuator piston is actuated back and forth by the spindle in the conventional system is described below.

FIG. 1 illustrates the position of the spindle when it is moved down (first position as shown in FIG. 1). Accordingly, the pressure port (P) 113 is connected to the port A 116 and the tank outlet is connected to port B 117. Thus, the pressurized fluid is forced into the piston rod side space forcing the piston downwards. The downward movement of the piston exits the fluid in the flat side space, through the pipe 140 flown into the tank through port B 117 of the valve, the tank inlet 112 and pipe 150.

Similarly, when the spindle is moved upwards, (not shown) the pressure port (P) 113 is connected to port B 117 and the tank inlet is 111 is connected to port A 116. Thus, the pressurized fluid enters the flat side space of the cylinder through pipe 140 forcing the piston upwards. The upward movement of the piston exits the fluid in the piston rod side space through the pipe 135. This forced fluid reaches the tank through the port A, tank inlet 111 and pipe 150. Thus, when the spindle is moved upwards, the piston is also moved upwards by the pressurized fluid. The actuator rod piston 160 is moved up and down (or linearly back and forth) within the actuator cylinder 155 when the spindle 118 is moved up and down. The piston rod 160 is coupled to the desired load to achieve the desired work done.

SUMMARY

According to first aspect, a flow control valve comprises outer hollow cylinder and an indexing member. The hollow cylinder comprises a pressure port, a tank port, a first port and a second port on the curved surface. The indexing member comprises an inner cylinder, and is fit to the hollow part of the outer cylinder. When the inner cylinder is at a first relative position with the outer cylinder, the pressure port is connected to the first port and tank outlet is connected to the second port. When the inner cylinder is at a second relative position with the outer cylinder, the pressure port is connected to the second port and tank outlet is connected to first port. According to another aspect, a system for controlling a movement of a piston in an actuator may comprise an indexing valve, an actuator and a pump. The actuator comprises piston and piston rod. The indexing valve comprises outer cylinder and indexed inner cylinder. The pump is used to inject pressurized fluid. In one embodiment, piston is moved in one direction by the pressurized fluid when the indexed inner cylinder is at first index. In another embodiment, the piston is moved in other direction by the pressurized fluid when the indexed inner cylinder is at second index position.

BRIEF DESCRIPTION OF DRAWINGS

FIG. 4A is a three dimensional view of the indexing member illustrating example structure on the inner cylinder.

FIG. 4B is a three dimensional view of the indexing member slightly turned to left exposing the opening and of through and through holes.

FIG. 6B illustrates the operation when the index part is rotated to align the index with reference.

DETAILED DESCRIPTION OF THE PREFERRED EXAMPLES

Several embodiments are described below, with reference to diagrams for illustration. It should be understood that numerous specific details are set forth to provide a full understanding of the invention. One skilled in the relevant art, however, will readily recognize that embodiments may be practiced without one or more of the specific details, or with other methods, etc. In other instances, well-known structures or operations are not shown in detail to avoid obscuring the features of the invention.

Figure 2:
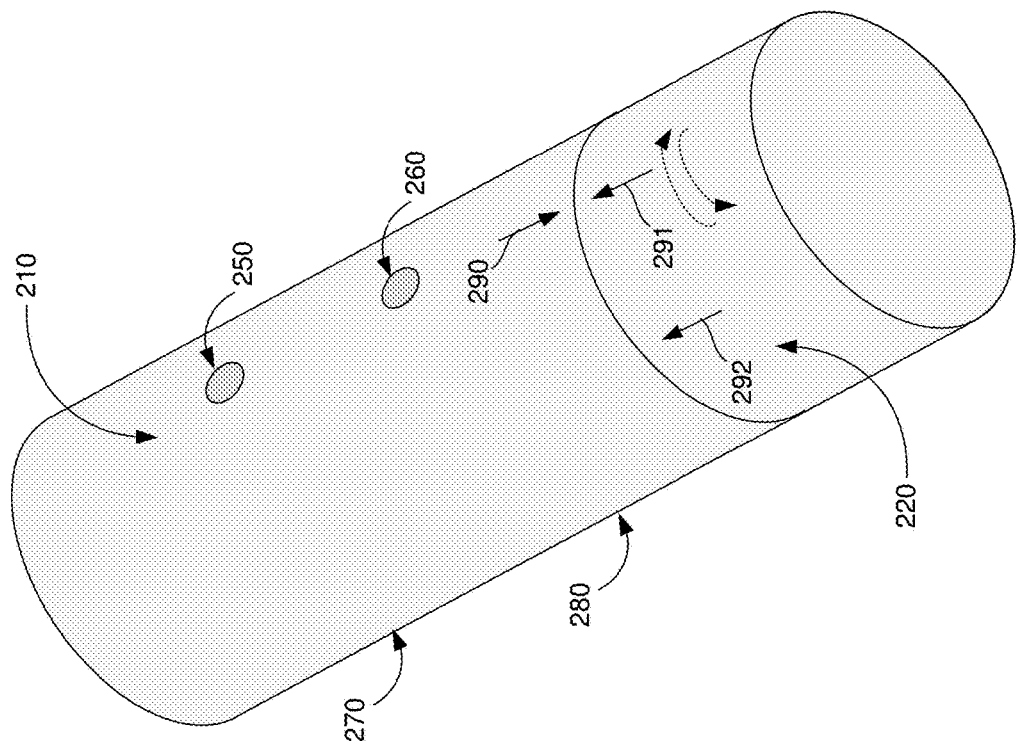
FIG. 2 is a three dimensional view of an example valve of the present disclosure.

FIG. 2 is a three dimensional view of an example valve of the present disclosure. The valve is shown comprising the outer cylinder 210 (or external cylinder) and an indexing member 220. The outer cylinder 210 comprises four holes 250, 260, 270 and 280. The holes 270 and 280 are not shown in the figure and are radially opposite to the holes 250 and 260 respectively. The outer cylinder 210 is shown with the reference mark 290. The indexing member 220 is shown with the index marks (or index) 291, 292 used to indicate the relative position of the outer cylinder and the indexing member 220. The indexing member 220 may be rotated to coincide (align) one of indexing marks 291 and 292 with the reference mark 290.

When the index 291 is aligned with the reference mark 290, the hole 250 is connected to the hole 270 and the hole 260 is connected to the hole 280. When the indexing member 220 is rotated and the index 292 is aligned to reference mark 290, the hole 250 is connected to the hole 280 and hole 260 is connected to the hole 270.

Figure 1:
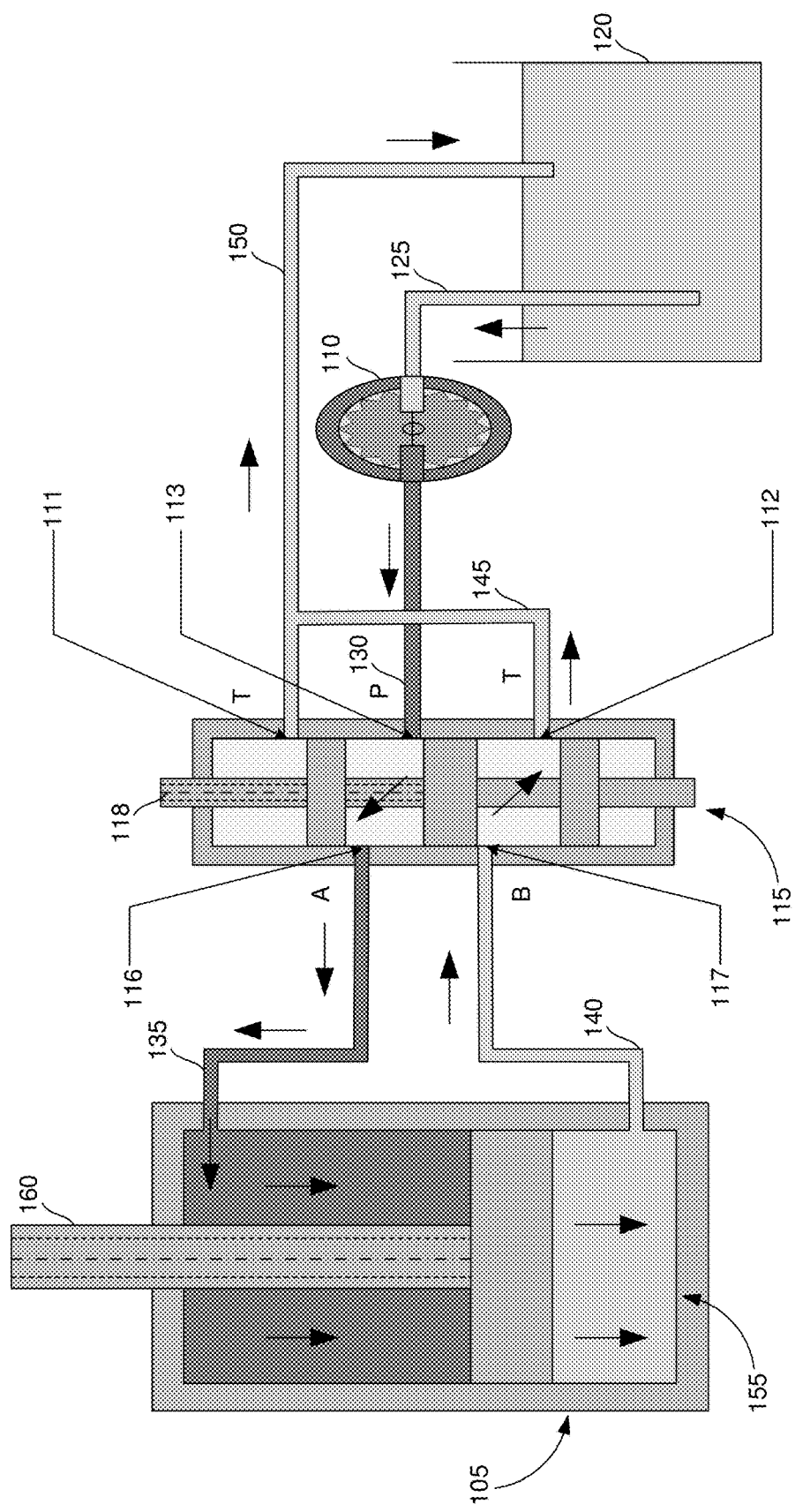
FIG. 1 is a conventional system shown comprising actuator, pump, tank and spool valve with connecting pipes.
Figure 3A:
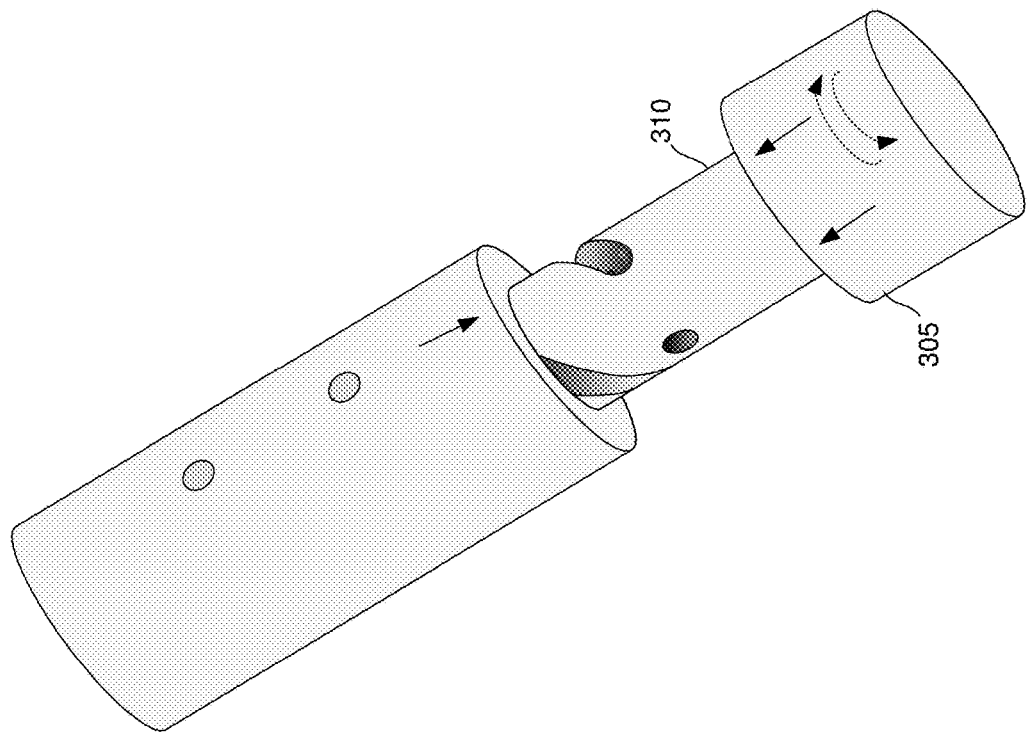
FIG. 3A is a three dimensional view exposing part of the internal structure of the indexing member.

FIG. 3A is a three dimensional view exposing part of the internal structure of the indexing member 220. As shown there the indexing member 220 comprises the base part 305 and the inner cylinder 310. The inner cylinder 310 may be a solid cylinder integrally attached to the (solid) base part 305. In an alternative embodiment, both the base part 305 and the inner cylinder 310 or manufactured on a single solid block. As a further alternative, indexing member 220 may be constructed suitably using materials of choices, thickness, creating some hollowness etc.

Figure 3B:
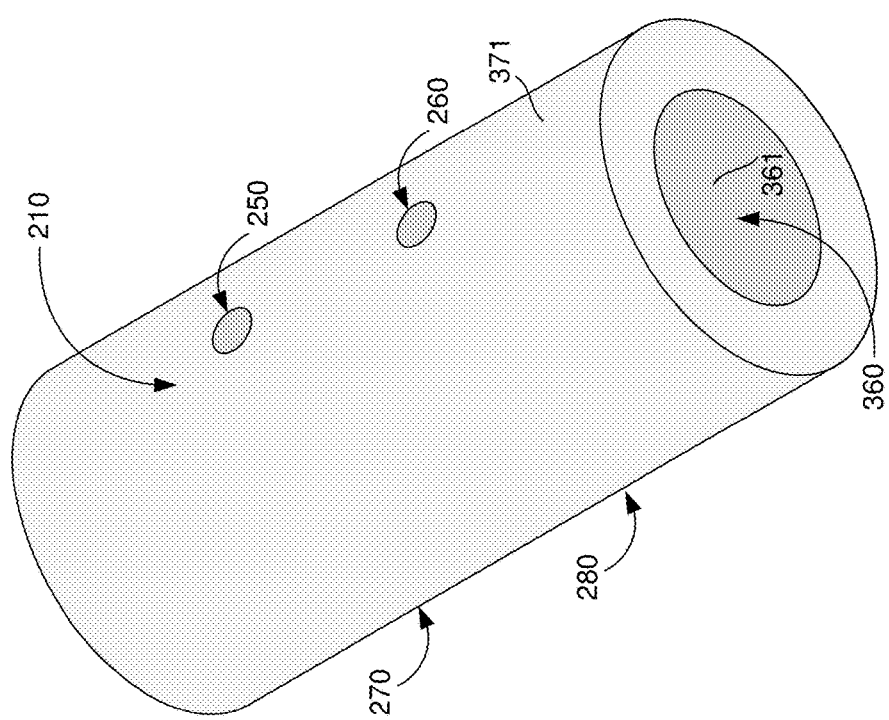
FIG. 3B is a three dimensional view exposing hollow part of the outer cylinder.

FIG. 3B is a three dimensional view exposing hollow part of the outer cylinder 210. The hollow part 360 is configured to accept the inner cylinder 310 of the indexing member 220. Each hole on the outer cylinder 210 provides a through path from outer surface 371 to inner surface 361. The outer cylinder 210 is a hollow cylinder having a inner and outer diameter. The diameter of the inner cylinder 310 is adjusted to equal to the inner diameter of the outer cylinder 210 such that the outer cylinder 210 is in precise push fit on to the inner cylinder 310 as shown in the FIG. 2. The outer cylinder 210 is sealed on top to prevent leakage. The structure of an example inner cylinder 310 is further illustrated below.

FIG. 4A is a three dimensional view of the indexing member 220 illustrating example structure on the inner cylinder 310. As shown, the example inner cylinder 310 is shown comprising grooves/channels 410 and 420, and the through and through holes 450, and 460. The grooves 410 and 420 are curved grooves machined on the curved surface of the inner cylinder 310. Each groove 410 and 420 comprises two ends. Ends 411 and 421 respectively forms one end of each groove 410 and 420. The other end of the each groove 410 and 420 are on the other side of the view (not visible) such that, the other end of the groove 410 is radially opposite to the end 421. Similarly, the other end of the groove 420 is radially opposite to the end 411. Each grooves 410 and 420 form a closed tube when an outer cylinder 210 is enclosed on the inner cylinder 310 thereby enabling flow of fluid or gases through the grooves.

The through and through hole 450 is shown with openings 450A and 450B and the through and through hole 460 is shown with openings 460A and 460B. The through and through holes 450 and 460 are drilled through the solid inner cylinder 310 enabling flow of fluid from opening 450A to 450B (or vice-versa) through the hole 450 and from opening 460A to 460 B through hole 460.

Figure 4C:
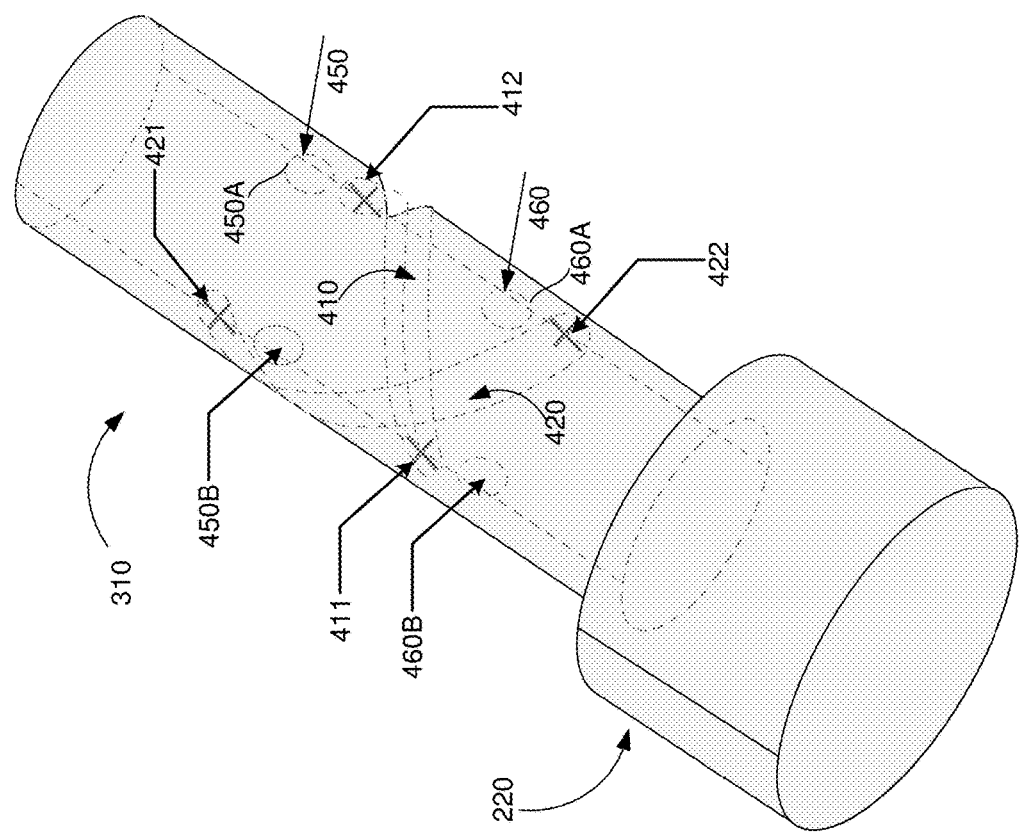
FIG. 4C is a transparent view showing the structure on the other side of the inner cylinder.

FIG. 4B is a three dimensional view of the indexing member 220 slightly turned to left exposing the opening 450A and 460A of through and through holes 450 and 460. FIG. 4C is a transparent view showing the structure on the other side of the inner cylinder 310 (otherwise invisible in FIG. 4B). Two ends of the each groove and two ends of each through and through hole are shown in the FIG. 4C. The FIG. 4C also shows the ends of the groove 410 and 420. The groove 410 is shown with ends 411 and 412, and groove 420 is shown with ends 421 and 422. In one example arrangement, any point between indexing positions 291 or 292 with reference point 290, could be chosen to obtain a locked position for the entire system to be at rest.

Operationally, referring to FIGS. 2 and 4C together, when the index 291 on the indexing member 220 is aligned with reference mark 290, the holes 250, 260, 270 and 280 on the outer cylinder 210 are respectively aligned with the through and through hole openings 450A, 460A, 450B and 460B. Thus, any fluid entering the hole 260 flows through the through and through hole 460 and flows out of hole 280. Similarly fluid entering the hole 250 flows through the through and through hole 450 and flows out of hole 270.

When the index 292 on the indexing member 220 is aligned with reference mark 290, the holes 250, 260, 270 and 280 of the outer cylinder 210 are respectively aligned with the grooves 411, 421, 412, and 422. Thus, any fluid entering the hole 250 flows downwards through the groove 420 and flows out of hole 280 (or vice versa). Similarly, the fluid entering the hole 260 flows upwards through the groove 410 and flows out of hole 270 (vice versa). Thus, changing the direction of the flow is achieved when the index is changed from 291 to 292. The manner in which the direction of the flow of the fluid is changed with changing index is further described below.

Figure 5B:
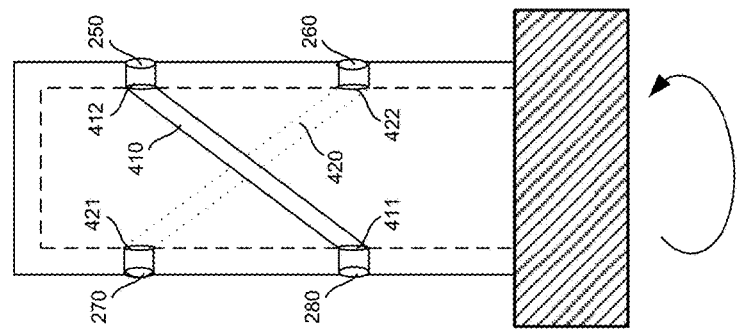
FIGS. 5A and 5B are diagrams of the valves illustrating the flow change in one embodiment.
Figure 5A:
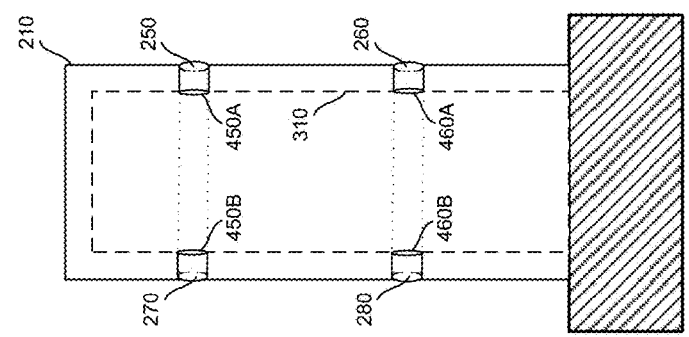

FIGS. 5A and 5B are diagrams of the valves illustrating the flow change in one embodiment. FIG. 5A illustrates the flow when the index 291 is aligned to reference mark 290. As shown there, the outer cylinder holes 250 and 270 are aligned to the through and through hole 450A and 450B and the outer cylinder holes 260 and 280 are aligned with through and through hole 460A and 460B. As a result, two straight paths are formed for flow of fluid. Thus, a fluid may enter through outer cylinder hole 250 and flow out of the outer cylinder hole 270 (or vice versa). Similarly, the fluid may enter outer cylinder hole 260 and flow out of the outer cylinder hole 280 (or vice versa).

FIG. 5B illustrates the flow when the index 292 is aligned to reference mark 290. As shown there, the outer cylinder holes 250 and 260 are aligned to the end points 412 and 422 and the outer cylinder holes 270 and 280 are aligned with the end points 421 and 411. As a result, groove 410 connects hole 250 and 280 (providing a path for flow). Similarly, the groove 420 connects holes 260 and 270 providing another path for fluid flow. Thus, a fluid may enter through outer cylinder hole 250 and flows downwards and out of the outer cylinder hole 280 (or vice versa). Similarly, the fluid may enter outer cylinder hole 260 and flows upwards and out through the hole 270 (or vice versa). Manner in which the valve 200 may be deployed to control the actuator piston in an example embodiment is described below in further detail.

Figure 6A:
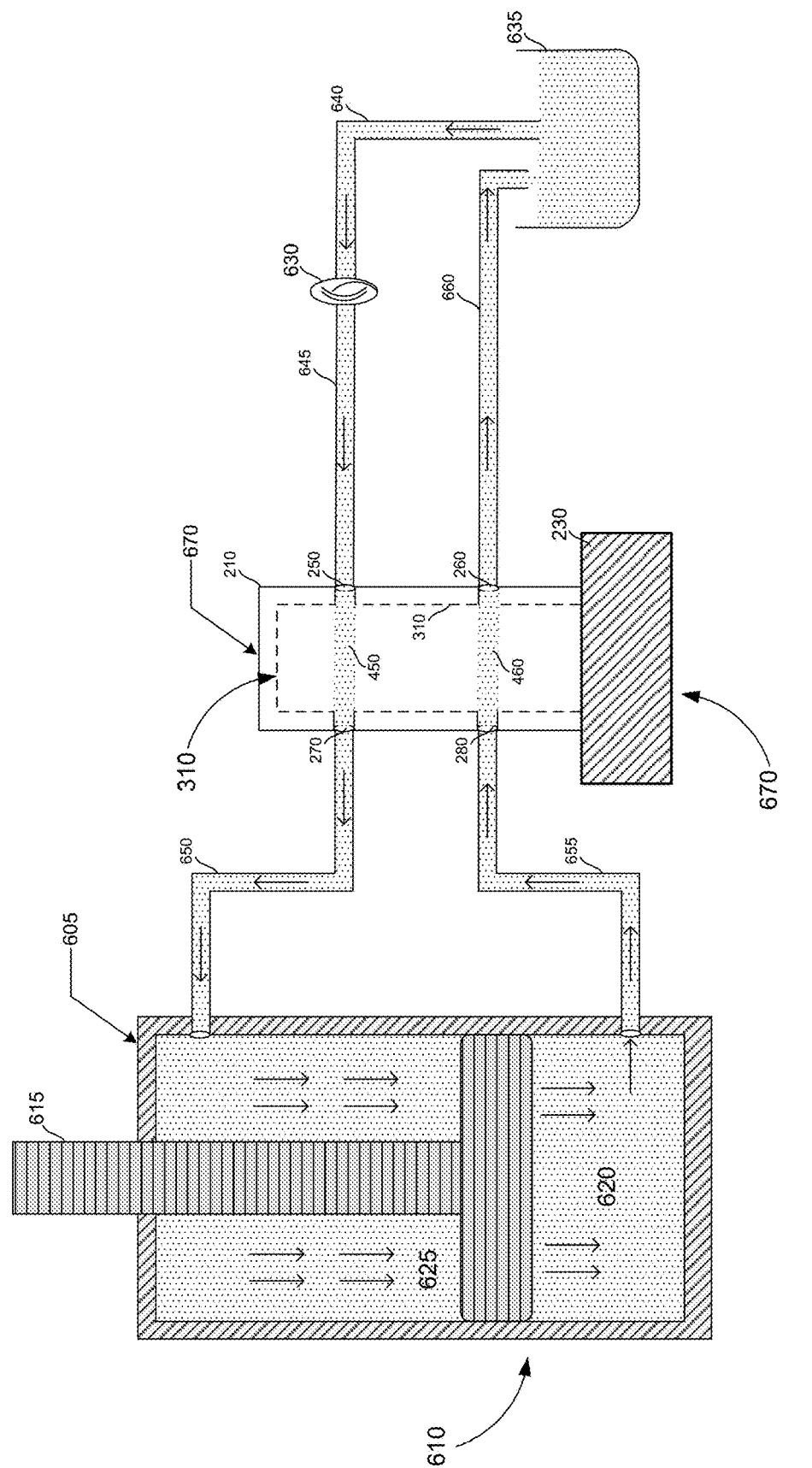
FIG. 6A is schematic diagram of a direction control arrangement for operation of the actuator piston in one embodiment.

FIG. 6A is schematic diagram of a direction control arrangement for operation of the actuator piston 615 in one embodiment. The direction control arrangement is shown comprising fluid tank 635, pump 630, indexing valve 670, and actuator 610. The pipes 640, 645, 650, 655, and 660 connect the fluid tank 635, pump 630, indexing valve 670, and actuator 610 as shown in the figure. The pump 630 sucks the fluid from the fluid tank 635 and forces the pressurized fluid on to the pipe 645.

When the indexing member 220 is rotated and aligned index 291 with reference mark 290 (first position of the index valve), the pressurized fluid is forced to the piston side of the actuator cylinder through the pipe 645, outer cylinder hole 250 and 270, through and through hole 450 of the inner cylinder 310, and pipe 650. The pressurized fluid forces the piston downwards thereby forcing the fluid in the flat side out of the actuator cylinder. This fluid from the flat side reaches the tank through pipe 655, outer cylinder holes 280 and 260, through and through hole 460, and pipe 660. Thus causing a downward movement of the piston in the actuator, hence achieving the work done in the first position.

FIG. 6B illustrates the operation when the index part is rotated to align the index 292 with reference 290. Accordingly, the grooves 410 and 420 (in dotted line) cross connect the outer cylinder holes there by swapping pressurized fluid to flow in to the flat side of the actuator cylinder. In particular, when the indexing member 220 is rotated and aligned to reference mark 290 (second position of the index valve), the pressurized fluid from pump 630 is forced to the flat side of the actuator cylinder through the pipe 645, outer cylinder hole 250 and 280, groove 410 of the inner cylinder, and pipe 655. The pressurized fluid pushes the piston upwards thereby forcing the liquid in the piston rod side out of the actuator cylinder. The released fluid from piston rod side reaches the tank through pipe 650, outer cylinder holes 270 and 260, groove 420, and pipe 660. This causing an upward movement of the piston in the actuator, hence achieving the work done in the second position.

Due to this arrangement the piston is moved downwards when the index part is rotated to anticlockwise (aligning 291 with reference 290) and the piston is moved upwards when the index part is rotated anticlockwise (aligning 292 with reference 290). The up and down movement of the piston is caused by a partial rotational motion of the indexing member 220. The piston movement is used for causing desired work done such as lifting of heavy weight, moving of heavy weight, digging, for example, the manner in which single indexing valve may be used for actuating multiple actuator in an embodiment of the present disclosure is further described below.

Figure 7A:
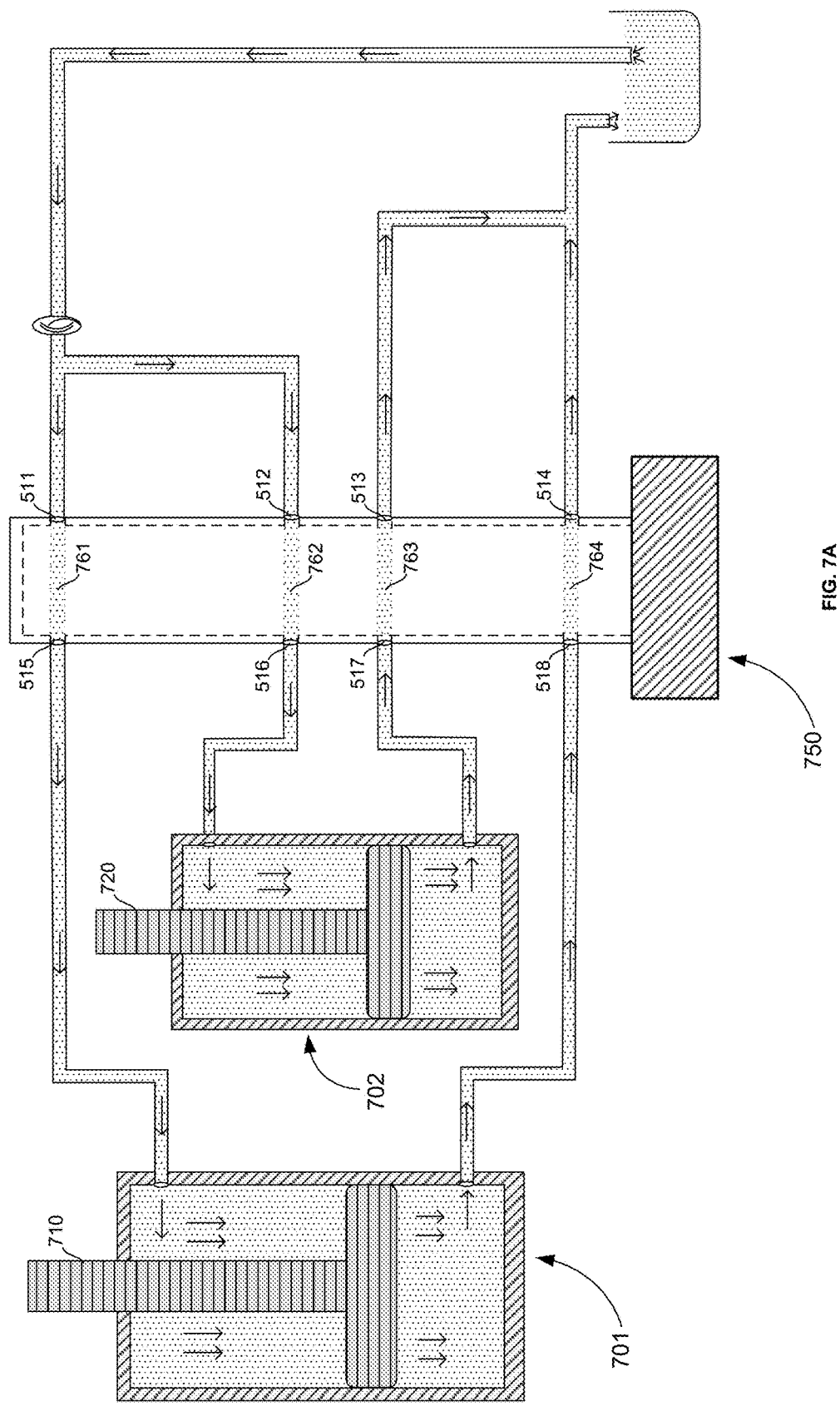
FIG. 7A illustrates an example arrangement for controlling multiple pistons (multiple actuators) using only a single indexing valve.

FIG. 7A illustrates an example arrangement for controlling multiple pistons (multiple actuators) using only a single indexing valve. FIG. 7A illustrates the operation of the flow control arrangement when the multi control index valve is at first position. The valve 750 is shown with two pressure inlets 511 and 512, two tank outlet 513, and 514, two ports A 515 and 516, and two ports B 517 and 518 (these are the holes on the outer cylinder). The port 511, 514, 515, and 518 are configured to control the actuator piston 710. The port 512, 513, 516, and 517 are configured to control the actuator piston 720. The multivalve is shown with the through and through holes 761, 762, 763, and 764. The through and through hole 761 connects to pressure inlet 511 and port A 515. The through and through hole 762 connects pressure inlet 512 and port A 516. The through and through hole 763 connects tank outlet 513 to port B 517, and the through and through hole 764 connects tank outlet 514 to port B 518.

In operation (referring to FIG. 7A), when the index is in first position the pressurized fluid is forced to the pressure inlet 511 and 512 through pipes 761 and 762 respectively. The pressurized fluid enters the piston rod side of the actuator 701 through the port A 515 connected to the piston rod side of the actuator 701. The pressurized fluid also enters the piston rod side of the actuator 702 through the port A 516 connected to the piston rod side of the actuator 702, thus, forcing the piston 710 and 720 downwards.

The fluid in the flat side of the actuator 701 is released to the tank through the port B 518 connected to flat side of the actuator 701. Similarly, fluid in the flat side of the actuator 702 is released to the tank through the port B 517 connected to flat side of the actuator 702. The tank outlets 513 and 514 are connected to the tank. The manner in which the pistons 710 and 720 may be pushed upward by changing the index is further described below.

Figure 7B:
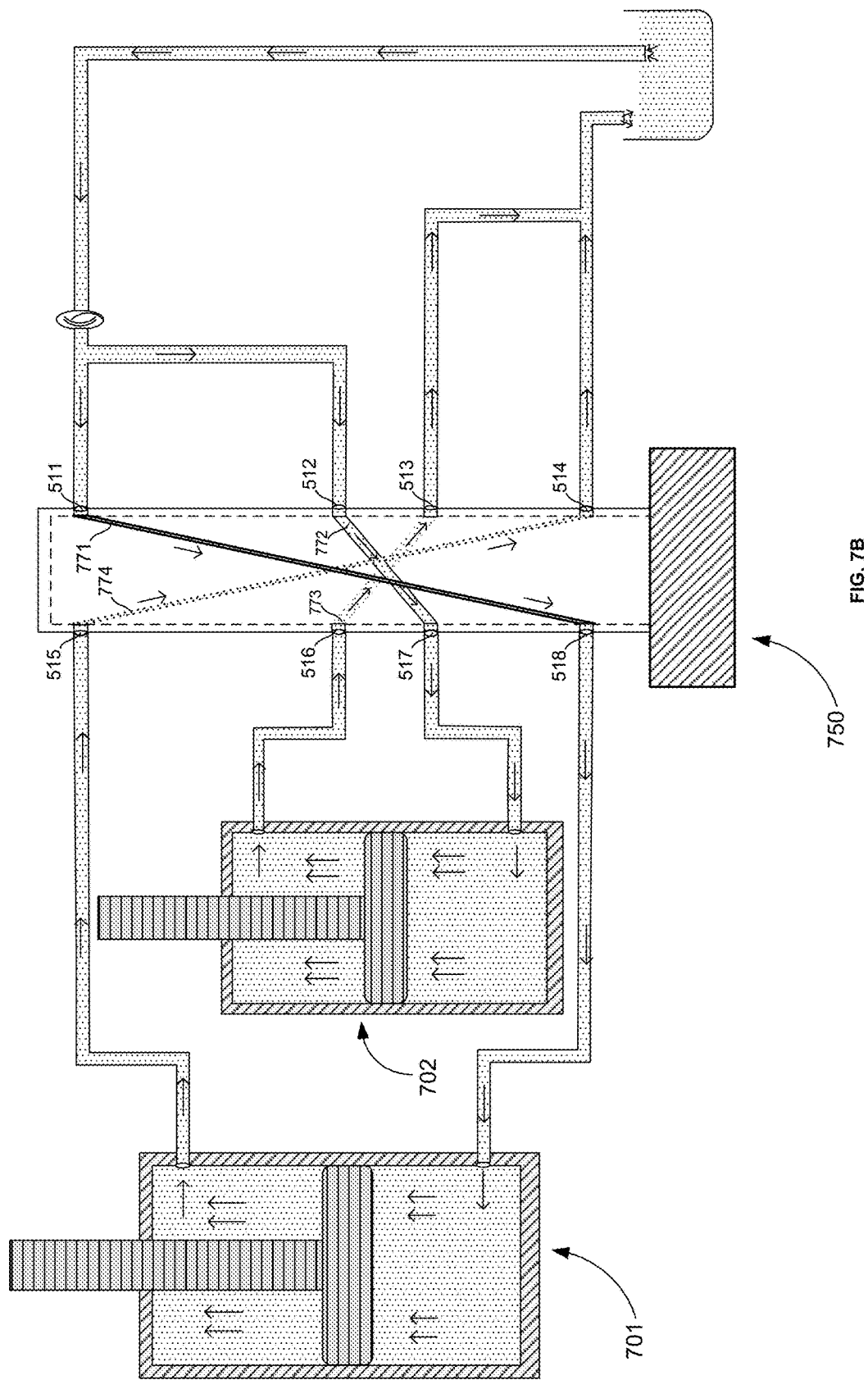
FIG. 7B illustrates the operation of the multi control indexing valve when the indexing is changed to the second position.

FIG. 7B illustrates the operation of the multi control indexing valve when the indexing is changed to the second position. As shown there, the multi control valve is shown with the grooves 771, 772, 773, and 774. The groove 771 connects to pressure inlet 511 and port B 518. The groove 772 connects pressure inlet 512 and port B 517. The groove 773 connects tank outlet 513 to port A 516, and the groove 764 connects tank outlet 514 to port A 515.

Accordingly, the pressurized fluid is forced through the Port B 517 and 518 into the flat side of the actuator 702 and 701 respectively and thereby forcing the pistons 720 and 710 upwards. The fluid forced from the piston rod side of the actuator 701 and 702 respectively is forced to the tank through port A 515 and 516.

Thus, the multiple pistons are simultaneously actuated using single indexing valve. Though the description is provided for two piston control, the valve may be implemented to control more number of pistons or actuators without deviating from the spirit of the invention.

Figure 8B:
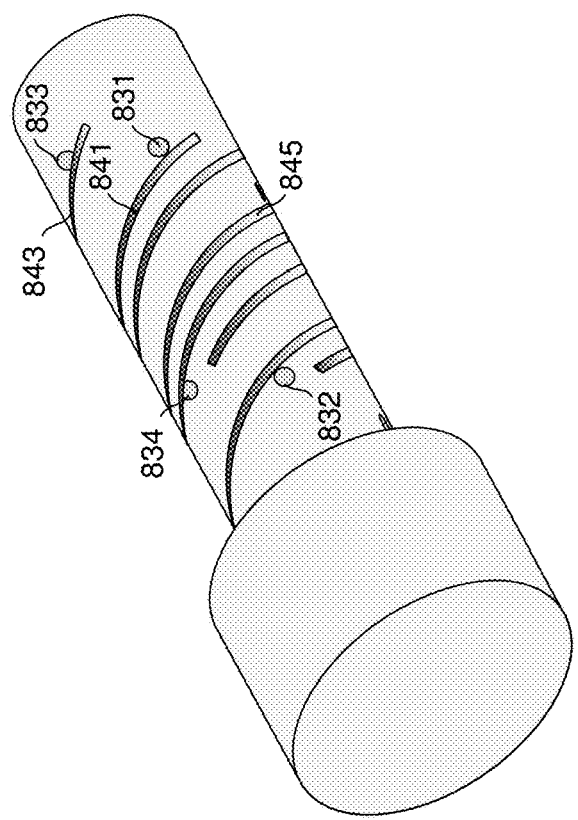
FIG. 8B illustrates the internal structure of the indexing member corresponding to the outer cylinder.
Figure 8A:
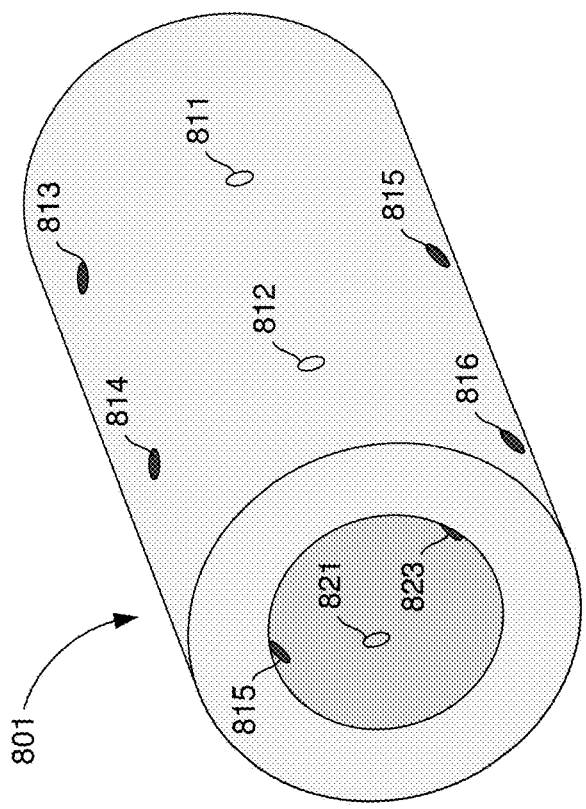
FIG. 8A illustrates an example outer cylinder with three sets of openings (each set comprising 4 openings/holes).

A three dimensional example construction of the multiple control valve is illustrated in FIG. 8A and FIG. 8B. FIG. 8A illustrates an example outer cylinder with three sets of openings (each set comprising 4 openings/holes). The openings 811, 812, 821 and 822 (not visible and is opposite to hole 811) may be used to control one actuator, in that, hole 811 may be used as pressure inlet, hole 812 may be used for tank outlet, the hole 821 may be used as port B and hole 822 may be used for port A. Thus, hole 821 and 822 may be connected to first actuator (say 701).

Similarly, the openings 813, 814, 823 and 824 (not visible and is opposite to hole 813) may be used to control one actuator, in that, hole 813 may be used as pressure inlet, hole 814 may be used for tank outlet, the hole 823 may be used as port B and hole 824 may be used as port A. Thus, hole 823 and 824 may be connected to second actuator (say 720).

The other set of openings 815, 816, 825 and 826 (not visible and is opposite to hole 815) may be used in similar way.

FIG. 8B illustrates the internal structure of the indexing member 220 corresponding to the outer cylinder 801. As shown there, the inner cylinder is shown comprising, 3 sets of through and through holes (each set comprising two through and through holes). In one index position, the first set of through and through holes 831 and 832 engages to first set of holes on the outer cylinder. Simultaneously, the other two sets of through and through holes (for example 833 and 834 and one more set are not visible) engage with corresponding other set of holes/opening on the outer cylinder.

The inner cylinder is also shown with grooves 841, 843, and 845. In the second index position, the groove 841 (and other groove opposite and connected to 841) engages with first set of openings thereby swapping the ports to change the direction of the flow of fluid. Similarly the groove 842 and 843 (and its counter parts) engages with the other two sets of the opening on the outer cylinder. The diameter and size of the through and through holes, grooves, and pipes connecting the ports may be appropriately designed to handle the desired pressure and load of the piston/actuator, without failure.

In another embodiment, the multiple control indexing valve may be implemented with more than two indexing position. In that, each set of index may be configured to control different actuators (ports). For example, when the indexing valve is rotated clock wise in full circle or half circle, the indexing valve may control different actuator serially. Further, the indexing valve may be configured to skip some index position (may be by rotating very fast) that control specific actuator connected to indexing valve but not requiring control.

Figure 9A:
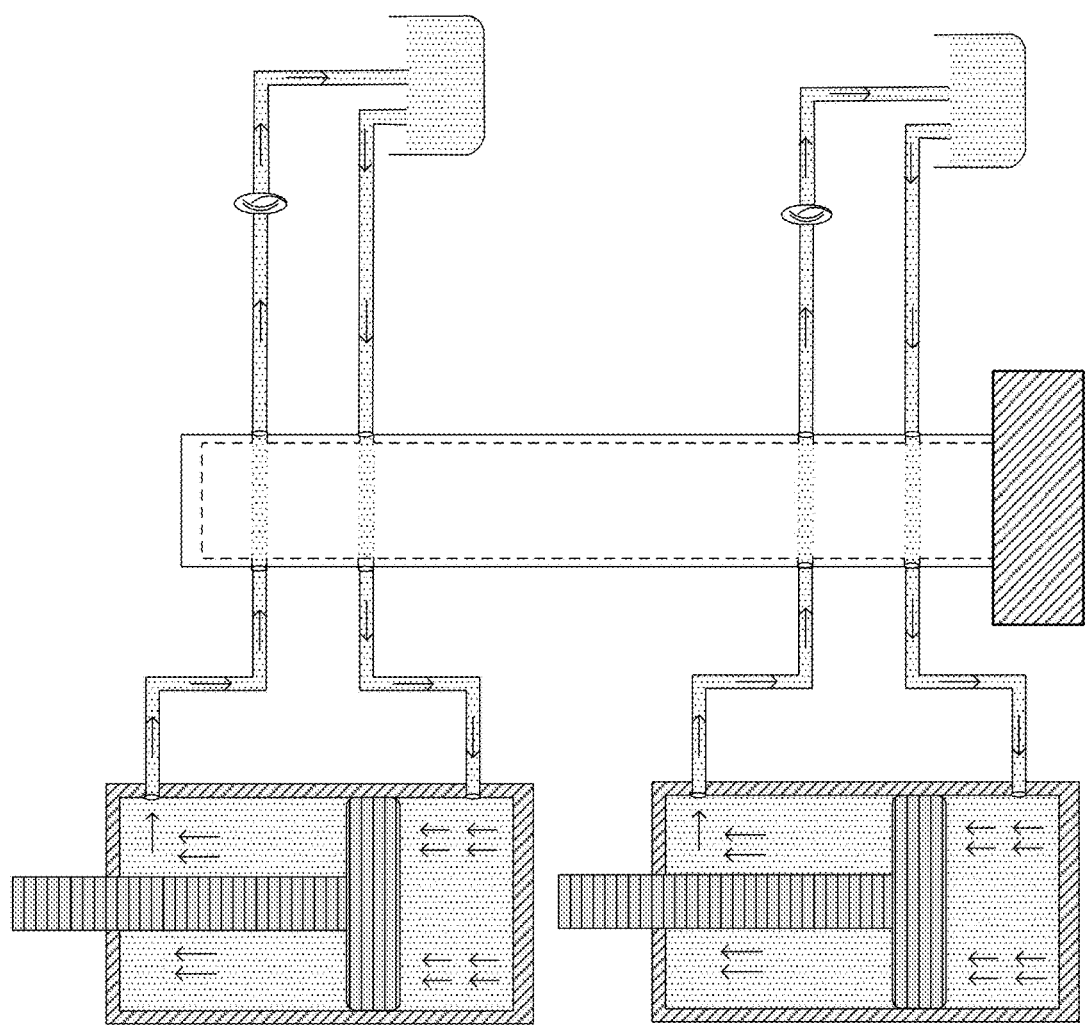
FIGS. 9A and 9B illustrates another alternative implementation of the indexing valve for controlling the multiple actuators.
Figure 9B:
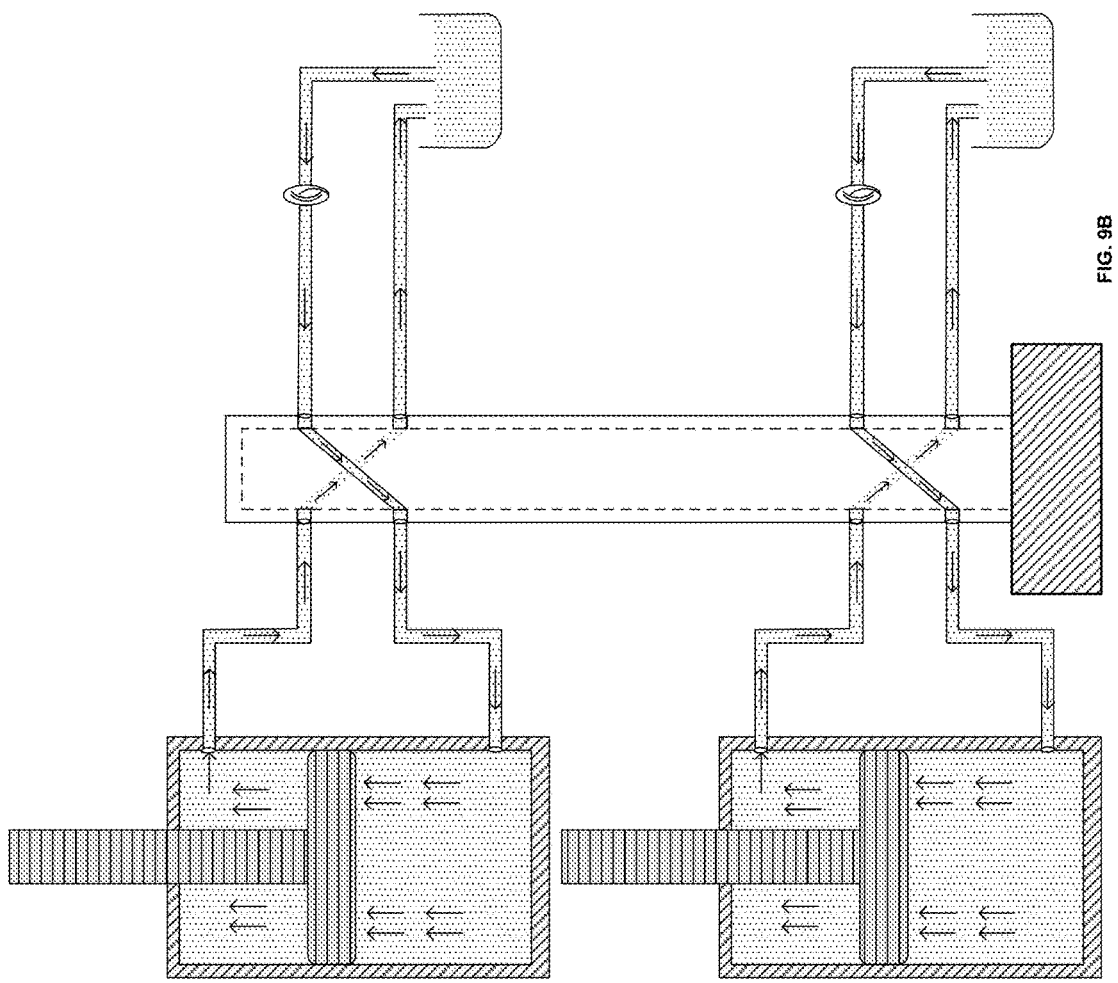

FIGS. 9A and 9B illustrates another alternative implementation of the indexing valve for controlling the multiple actuators. As shown there, the linear area (plinth) of the indexing valve is exploited to implement the multiple set of openings. The operation of the FIGS. 9A and 9B is apparent to the readers by from the forgoing description.

While various examples of the present disclosure have been described above, it should be understood that they have been presented by way of example, and not limitation. Thus, the breadth and scope of the present disclosure should not be limited by any of the above-described examples, but should be defined in accordance with the following claims and their equivalents.

What is claimed is:

1. A system for controlling a plurality of pistons in a corresponding plurality of actuators comprising:
a pump for injecting a pressurized fluid into the plurality of actuators;
a tank sourcing and sinking the pressurized fluid to and from the plurality of actuators; and
a cylindrically shaped valve with an outer hollow cylinder and an inner solid cylinder, coupling the pressurized fluid to at least two actuators in the plurality of actuators to activate the corresponding pistons in one of a first and a second direction when the inner solid cylinder, in relation to the outer hollow cylinder is at an indexed position among a plurality of indexed positions, in that, the outer hollow cylinder having a first set of holes coupled to the pump injecting the pressurized fluid, a second set of holes coupled to the tank, a third set of holes coupled to one end of the plurality of actuators and a fourth set of holes coupled to another end of the plurality of actuators, and the inner cylinder with a cylindrical base, and the inner cylinder having a first and a second set of non-overlapping spiral grooves that are parallel to each other and exposed on a cylindrical surface and a first and a second set of through holes, in that the first set of holes are at a different distance from the cylindrical base, the third set of holes maintain one to one correspondence with the first set of holes and the first set of holes are at 180 degrees opposite to the third set of holes, the second set of holes maintain one to one correspondence with the first set of holes and are at a same distance from the first set of holes and the first set of holes and the second set of holes are aligned in a straight line, the fourth set of holes maintain one to one correspondence with the second set of holes and the fourth set of holes are at 180 degrees opposite to the second set of holes.

2. The system of claim 1, wherein the first set of non-overlapping spiral grooves couple the first set of holes to the fourth set of holes and the second set of non-overlapping spiral grooves couple the second set of holes to the third set of holes independently at corresponding a first set of indexed positions in the plurality of indexed positions, in that a length of each non-overlapping spiral grooves are equal.

3. The system of claim 1, wherein the first set of through holes couple the first set of holes to the third set of holes and the second set of through holes couple the second set of holes to the fourth set of holes independently at corresponding a second set of indexed positions in the plurality of indexed positions, in that the first and the second set of through holes do not intersect the first and second non-overlapping spiral grooves.

4. The system of claim 3, wherein the first set of indexed positions and the second set of indexed positions are interleaved such that when the cylindrical base is rotated in one direction, an indexed position in the first set of indexed position is followed by an indexed position in the second set of indexed positions thereby consecutively controlling the plurality of actuators in series.

5. The system of claim 4, wherein an actuator in the plurality of actuators controlled at a first and second consecutive indexed position in the first and the second set of indexed position is not controlled when the cylindrical base is rotated to skip by passing the first and second consecutive indexed position.

\* \* \* \* \*